United States Patent
Dunn

(10) Patent No.: US 9,874,991 B2
(45) Date of Patent: Jan. 23, 2018

(54) PROGRESSIVE TILING

(71) Applicant: Apple Inc., Cupertino, CA (US)

(72) Inventor: Corbin R. Dunn, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 690 days.

(21) Appl. No.: 13/830,454

(22) Filed: Mar. 14, 2013

(65) Prior Publication Data

US 2014/0201673 A1 Jul. 17, 2014

Related U.S. Application Data

(60) Provisional application No. 61/752,623, filed on Jan. 15, 2013.

(51) Int. Cl.
| | | |
|---|---|---|
| *G06F 3/0485* | (2013.01) | |
| *G06F 3/0481* | (2013.01) | |
| *G06F 9/44* | (2006.01) | |
| *G09G 5/14* | (2006.01) | |

(52) U.S. Cl.
CPC .......... *G06F 3/0481* (2013.01); *G06F 9/4443* (2013.01); *G09G 5/14* (2013.01); *G06F 3/0485* (2013.01); *G06F 2203/04803* (2013.01); *G09G 2340/02* (2013.01)

(58) Field of Classification Search
CPC ..... G06F 3/0481; G06F 3/0482; G06F 3/0485
USPC ........................................ 715/781, 792, 793
See application file for complete search history.

(56) References Cited

U.S. PATENT DOCUMENTS

| | | | |
|---|---|---|---|
| 7,853,891 B2 | 12/2010 | Chaudhri et al. | |
| 8,032,843 B2 | 10/2011 | Ording et al. | |
| 8,271,898 B1 * | 9/2012 | Mattos et al. | 715/784 |
| 2001/0054131 A1 * | 12/2001 | Alvarez et al. | 711/105 |
| 2007/0288863 A1 | 12/2007 | Ording et al. | |
| 2008/0298697 A1 * | 12/2008 | Lee | G06F 3/04817 382/243 |
| 2009/0064057 A1 | 3/2009 | Bull et al. | |
| 2010/0095340 A1 * | 4/2010 | Ei | H04N 7/17318 725/116 |
| 2010/0281402 A1 * | 11/2010 | Staikos | G06F 17/30899 715/760 |
| 2012/0174121 A1 * | 7/2012 | Treat et al. | 719/318 |
| 2012/0256949 A1 * | 10/2012 | Treat et al. | 345/629 |
| 2012/0266068 A1 * | 10/2012 | Ryman et al. | 715/719 |

* cited by examiner

*Primary Examiner* — Shen Shiau

(74) *Attorney, Agent, or Firm* — Fish & Richardson P.C.

(57) ABSTRACT

A user interface (UI) is displayed on a display coupled to an electronic device. The UI includes a first area of the UI visible on the display. A non-visible UI element corresponding to a second area of the UI that may be displayed in response to a user input on the electronic device is determined. An image of the non-visible UI element is drawn into a tile in a tile layer that provides a non-visible representation of views associated with the UI, the tile layer stored in a temporary memory area. The image drawn into the tile in the tile layer is compressed. In response to a user input on the electronic device, a representation of the second area of the UI is displayed on the display including the compressed image.

24 Claims, 12 Drawing Sheets

PROGRESSIVE TILING

CROSS-REFERENCE TO RELATED APPLICATIONS

This application claims priority to U.S. Provisional Application No. 61/752,623, filed on Jan. 15, 2013, and titled "PROGRESSIVE TILING," which is incorporated herein by reference in its entirety for all purposes.

TECHNICAL FIELD

This subject matter is generally related to progressive tiling of user interface areas for display on an electronic device.

BACKGROUND

Electronic devices often use user interfaces (UIs), such as graphical user interfaces (GUIs), to display content, for example, graphical representations of electronic documents, images, and text. Users can navigate between the displayed content by interacting with the electronic device using various means, such as a keyboard, a mouse or a touchpad, or by using one or more fingers and/or making gestures on a touch-sensitive surface of the display of the electronic device.

SUMMARY

This disclosure describes methods, systems and devices that use progressive tiling, which include progressive overdraw, or UI stamping, or both, to display content on a UI shown on the display of an electronic device.

In one aspect, a user interface (UI) is displayed on a display coupled to an electronic device. The UI includes a first area of the UI visible on the display. A non-visible UI element corresponding to a second area of the UI that may be displayed in response to a user input on the electronic device is determined. An image of the non-visible UI element is drawn into a tile in a tile layer that provides a non-visible representation of views associated with the UI, the tile layer stored in a temporary memory area. The image drawn into the tile in the tile layer is compressed. In response to a user input on the electronic device, a representation of the second area of the UI is displayed on the display including the compressed image.

Implementations may include one or more of the following features. The first and second areas may include content associated with the UI that are viewable on the display of the electronic device. The UI may include a graphical user interface (GUI). The content may be selected from the group consisting of UI features, graphical images and electronic documents.

The first and second areas may share content, the second area corresponding to an incremental change in the content associated with the first area. The second area may include an additional content that is rendered visible on the display of the electronic device in response to the user input.

The user input may be one of a scrolling movement, a click, or a drag. The display may include a touchscreen display, the user input being one of a pinch, a swipe, a flick, a drag or a touch.

The tile may correspond to a logical section of the UI. Each of the first and second areas may be mapped to a plurality of tiles. A size of the tile may be based on a certain number of pixels associated with a section of the display.

The tile layer may include a pre-cached bitmap of the UI. The tile layer may include compressed images corresponding to UI elements included in a view of the UI.

Determining a non-visible UI element corresponding to a second area of the UI may comprise determining non-visible UI elements that are spatially adjacent to UI elements included in the first area of the UI. Images of the non-visible UI elements may be drawn into tiles in the tile layer, wherein a particular UI element may be drawn into a particular tile whose relative position in the tile layer map to a relative placement of the particular UI element in the UI. The images of the non-visible UI elements that are spatially adjacent to UI elements included in the first area of the UI may be compressed with varying degrees of compression such that the degree of compression increases as the non-visible UI elements are spatially further away from the UI elements included in the first area of the UI.

The uncompressed UI element corresponding to the compressed image shown in the second area may be retrieved. The uncompressed UI element may be rendered in the second area shown on the display replacing the compressed image.

Images of non-visible UI elements corresponding to the second area of the UI may be drawn into tiles and compressed one at a time until predetermined thresholds are met, or the non-visible UI elements associated with the second area of the UI are drawn in entirety. The predetermined thresholds may include an amount of memory consumed by drawing images of the non-visible UI elements into the tiles and compressing the images. The predetermined thresholds may include an amount of power consumed by drawing images of the non-visible UI elements into the tiles and compressing the images. The predetermined thresholds may include a size or count of the tiles into which the images of the non-visible UI elements corresponding to the second area of the UI are drawn.

The UI that includes a first area of the UI visible on the display may be displayed using a foreground process thread executed on the electronic device. At least one of an idle timer on the foreground process thread, or a background process thread executed on the electronic device, may determine the non-visible UI element corresponding to the second area may be determined, draw the image of the non-visible UI element into the tile in the tile layer and compress the image. At least one of the idle timer on the foreground process thread or the background process thread may determine the non-visible UI element corresponding to the second area, draw the image of the non-visible UI element into the tile in the tile layer and compress the image when the foreground process thread is idle.

In another aspect, a user interface (UI) is displayed on a display coupled to an electronic device. The UI includes a first area of the UI visible on the display. A non-visible UI element is determined that corresponds to a second area of the UI that may be displayed in response to a user input on the electronic device. The second area includes a plurality of non-visible UI elements. The non-visible UI element is retrieved and added to a parent UI element. An image of the non-visible UI element is drawn to a tile in a tile layer that provides a non-visible representation of views associated with the UI. The tile layer is stored in a temporary memory area and includes tiles in which images of a plurality of non-visible UI elements corresponding to the second area are drawn. The image drawn into the tile is compressed. The tile including the compressed image is stored in the temporary memory area. The non-visible UI element is removed from the parent UI element. In response to a user input on the electronic device, the second area of the UI is displayed on the display including the compressed image.

Implementations may include one or more of the following features. The first and second areas may include content associated with the UI that are viewable on the display of the electronic device. The UI may include a graphical user interface (GUI). The content may be selected from the group consisting of UI features, graphical images and electronic documents.

The first and second areas may share content, the second area corresponding to an incremental change in the content associated with the first area. The second area may include an additional content that is rendered visible on the display of the electronic device in response to the user input.

The user input may be one of a scrolling movement, a click, or a drag. The display may include a touchscreen display, the user input being one of a pinch, a swipe, a flick, a drag or a touch.

The tile may correspond to a logical section of the UI. Each of the first and second areas may be mapped to a plurality of tiles. A size of the tile may be based on a certain number of pixels associated with a section of the display.

The tile layer may include a pre-cached bitmap of the UI. The tile layer may include compressed images corresponding to UI elements included in a view of the UI.

The uncompressed UI element corresponding to the compressed image shown in the second area may be retrieved. The uncompressed UI element may be rendered in the second area shown on the display replacing the compressed image.

A plurality of non-visible areas of the UI may be identified. Non-visible UI elements that are associated with the plurality of non-visible areas may be determined. The non-visible UI elements may be retrieved into respective parent UI elements. Images of the non-visible UI elements may be drawn into tiles in the tile layer. The images drawn into the tiles may be compressed. The tiles including the images may be stored in the temporary memory area and the UI elements may be removed from the respective parent UI elements. In response to a user input on the electronic device, an area selected from the plurality of areas may be displayed including a compressed image corresponding to a UI element included in the selected area.

Determining a non-visible UI element corresponding to a second area of the UI may comprise determining non-visible UI elements that are spatially adjacent to UI elements included in the first area of the UI. Images of the non-visible UI elements may be drawn into tiles in the tile layer, wherein a particular UI element may be drawn into a particular tile whose relative position in the tile layer map to a relative placement of the particular UI element in the UI. The images of the non-visible UI elements that are spatially adjacent to UI elements included in the first area of the UI may be compressed with varying degrees of compression such that the degree of compression increases as the non-visible UI elements are spatially further away from the UI elements included in the first area of the UI.

Images of non-visible UI elements corresponding to the second area of the UI may be drawn into tiles and compressed one at a time until predetermined thresholds are met, or the non-visible UI elements associated with the second area of the UI are drawn in entirety. The predetermined thresholds may include an amount of memory consumed by drawing images of the non-visible UI elements into the tiles and compressing the images. The predetermined thresholds may include an amount of power consumed by drawing images of the non-visible UI elements into the tiles and compressing the images. The predetermined thresholds may include a size or count of the tiles into which the images of the non-visible UI elements corresponding to the second area of the UI are drawn.

The UI that includes a first area of the UI visible on the display may be displayed using a foreground process thread executed on the electronic device. At least one of an idle timer on the foreground process thread, or a background process thread executed on the electronic device, may determine the non-visible UI element corresponding to the second area may be determined, draw the image of the non-visible UI element into the tile in the tile layer and compress the image. At least one of the idle timer on the foreground process thread or the background process thread may determine the non-visible UI element corresponding to the second area, draw the image of the non-visible UI element into the tile in the tile layer and compress the image when the foreground process thread is idle.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

The same reference symbol used in various drawings indicates like elements.

DETAILED DESCRIPTION

Figure 1:
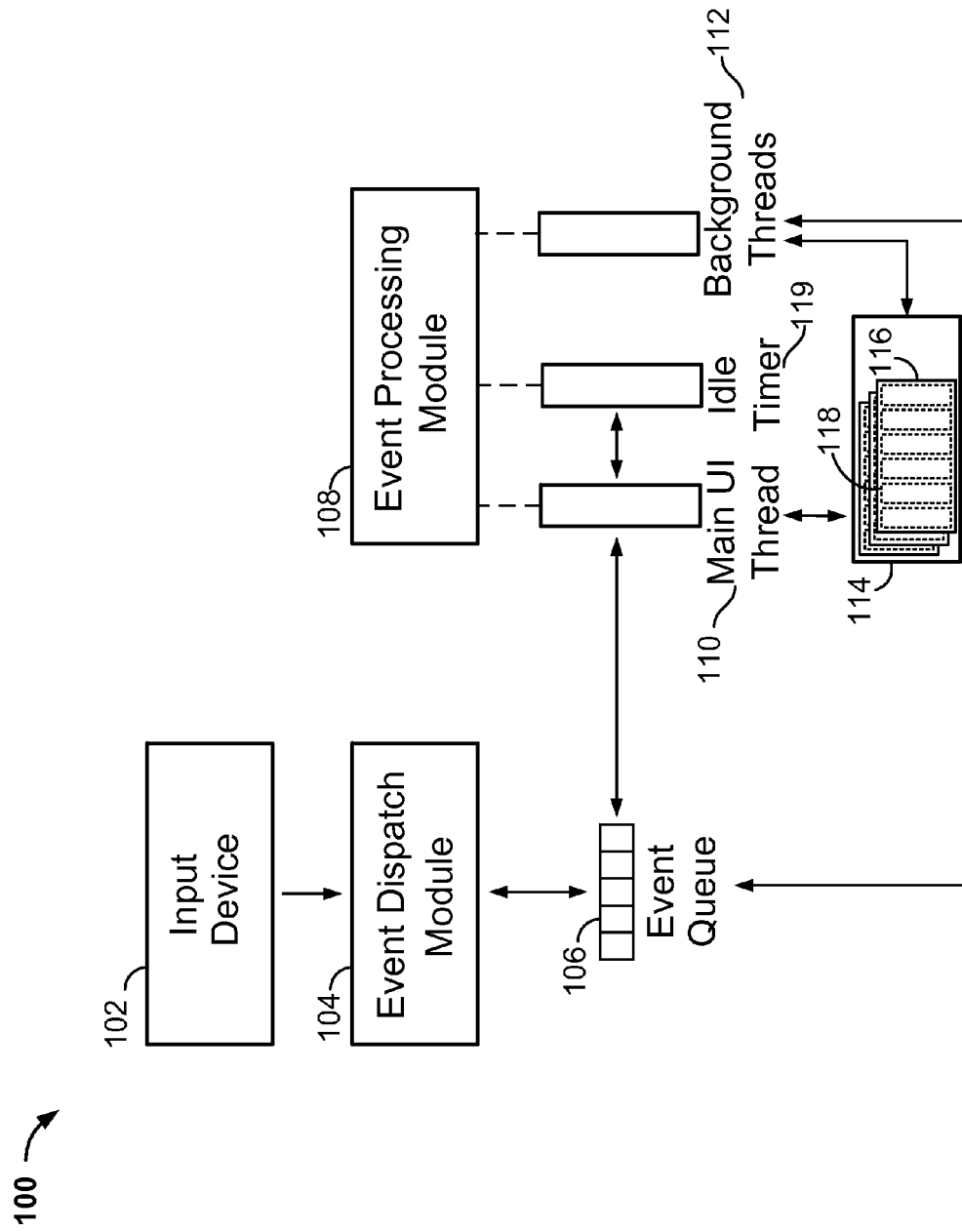
FIG. 1 illustrates an example of an electronic device that is used for progressive tiling.

An electronic device can display content on a display, such as a monitor or a Liquid Crystal Display (LCD) screen coupled to the device, using a user interface (UI). In some computing environments, the electronic device can run an operating system that uses one or more processes for performing various jobs, such as managing the content shown on the UI or executing some other computer program. Each process can spawn one or more threads that can be used to execute various sub-tasks, with a thread being the smallest unit of processing that can be scheduled by the operating system.

The process, or processes, which are configured to manage the UI and the content shown on the UI, may use several threads for displaying content on the display. There may be a first or "main" thread that is the primary thread assigned to process tasks relating to the UI. For example, the UI can be a graphical user interface (GUI) and the main thread can be used to render the GUI content on the display and to process user input events that are received by the electronic device through some suitable input mechanism, such as through a mouse or keyboard input, or by a user touch through a touch-sensitive display.

In some implementations, the UI processes use one or more additional threads, which may be referred to as "background" threads, to supplement the functionality of the main thread. For example, when the main thread is involved in rendering GUI content on the display, the background threads can be used to process the input events. A background thread runs separately from the main thread and is able to process its own tasks concurrently with the tasks being processed by the main thread.

In some implementations, the background threads can be used to process a scrolling input event, that is, a user input that moves the displayed GUI content up or down, or sideways. When a user input is received for scrolling the GUI content, a background thread may be used for adding GUI content to the display in the direction of movement of the scroll, and removing content in the opposite direction. The main thread is used for drawing the content added by the background thread.

The content associated with a rendering of the GUI at a time may be referred to as a "view," and subsections of the content may be referred to as "subviews." Therefore, when GUI content are added or removed from the display due to a scrolling input event, subviews may be shown or hidden. In some implementations, removing and adding subviews during a fast scroll may take too much time. If additional subviews are to be rendered due to the extent of the scrolling event, the delay may be worse because there are more subviews to remove in the opposite direction. From a user perspective, the delay may manifest as blank spaces, white spaces, or placeholder graphic such as a checkerboard graphic, on the GUI shown on the display while the subviews are being fetched and drawn. The blank spaces, white spaces or the placeholder graphic, indicate to the user missing GUI content due to processing delay by the operating system.

In some implementations, the delay in showing the GUI content may be reduced or eliminated altogether by using progressive overdrawing. In such implementations, the UI process will be told to draw non-visible images of non-visible UI elements into sections of a pre-cached bitmap in memory. The bitmap is known as a "tile layer," and each logical section of the tile layer is known as a "tile." Images of the non-visible UI elements, which may represent subviews of the GUI, are drawn into tiles in the tile layer. Upon drawing the images of the UI elements into the tiles, the background threads compress the images using one or more suitable image compression algorithms. Subsequently, when a scrolling input event is received, portions of the GUI may be shown on the display with the compressed images, if the uncompressed UI contents could not be drawn fast enough during the scroll.

The GUI portions with the compressed images may be drawn by the UI process upon a scroll. As the scrolling event is performed, the process will draw images of additional non-visible UI elements into tiles, which may subsequently be displayed by the main thread depending on the extent of the scroll. In some implementations, the images of non-visible UI elements may be drawn on idle, that is, when no input event is being processed. In some implementations, the images of non-visible UI elements may be drawn in a background thread. Once the UI elements have been drawn into one or more images, the images are compressed on a background thread. When a scrolling input event is executed, the process may show any pre-cached compressed image as a valid GUI content as long as the velocity of the scroll is not zero, while the process continues to pre-cache areas of the GUI further ahead in the same manner. Once scrolling stops, the uncompressed subviews are drawn (if they are not already there).The mechanism of drawing images of the non-visible UI elements into tiles, compressing the images and displaying the GUI with the compressed images may be referred to as "progressive overdraw."

The computational burden of displaying areas of the GUI with compressed images can be improved by utilizing idle time to draw additional content on the main thread, and using the background threads to do processing of that drawn content by compressing the content to save memory. The UI process will temporarily add UI elements to one or more additional views of the UI in temporary memory, such as a buffer, and draw images of the added UI elements into tiles in a tile layer in the buffer. A background thread compresses the drawn images to save memory. The UI elements are then removed from the buffer, but the compressed images are stored in the buffer for representing the additional UI elements. By this mechanism, which is referred to as "view stamping" or "UI stamping", additional UI subviews are proactively "stamped" into images in the tile layer. Progressive overdraw, or UI stamping, or a suitable combination of both, may be referred to as "progressive tiling."

Methods, systems and devices that use progressive tiling, including progressive overdraw, or UI stamping, or both, to show UI content on the display of an electronic device, are described in the following sections. For the purposes of this discussion, in the following sections, an user input event will be understood to include clicking or "hovering" with a mouse or other input device over a UI element, or touching, tapping or gesturing with one or more fingers or a stylus on a UI element shown on a display of an electronic device. UI elements can include GUI features such as virtual buttons, menus, selectors, switches, sliders, scrubbers, knobs, thumbnails, links, icons, radial buttons, checkboxes and any other mechanism for receiving input from a user. UI elements can also include electronic files, graphical images, texts, other forms of media such as audio and video, or any suitable combination of one or more of the above.

FIG. 1 illustrates an example of an electronic device 100 that is used for progressive tiling. The electronic device 100 includes an input device 102, an event dispatch module 104, and an event processing module 108. Events are buffered in an event queue for processing by a main UI thread 110 and background threads 112, which also access a buffer 114 for processing a tile layer 116 that includes tiles 118. The idle timer 119 is configured to perform processing tasks during periods when the main UI thread 110 is not performing some task.

The electronic device 100 may be a desktop computer, a notebook or laptop computer, or any other appropriate portable or stationary computing device. Alternatively, the electronic device 100 may be a mobile device such as a cellular phone, a smartphone, an electronic tablet, an e-book reader or a music player.

The electronic device 100 includes one or more processors configured to execute instructions stored by a computer readable medium for performing various client operations, such as input/output, communication, data processing, software execution and the like. The computer readable medium may include read-only memory (ROM), random access memory (RAM), hard disk storage, or any suitable combination of RAM, ROM and disk storage. The instructions may include operating system instructions, including one or more processes that present and manage a UI on a display coupled to the electronic device. The UI may be a GUI.

The electronic device 100 stores user data in the computer readable medium or in some other storage coupled to the electronic device 100. A user of the electronic device may navigate the GUI presented on the display of the electronic device, access the user data, or perform some other suitable function, by interacting with the electronic device 100 using the input device 102. The input device 102 may be a keyboard, a mouse, a touchpad, or a trackball, which is coupled to the electronic device 100. The input device 102 can generate input data, for example, input device events.

In some implementations, the display coupled to the electronic device 100 is a proximity-sensitive display (for example, a touch screen) and the input device 102 may be the display itself with a touch-sensitive surface. In such implementations, the input device 102 may include a touch component that implements a touch event model for mapping received touch inputs into input device events. The touch-sensitive surface of the display can process multiple simultaneous points of input, for example, input device events, including processing data related to the pressure, degree or position of each point of input. Such processing may facilitate gestures with multiple fingers, including pinching and swiping.

The event dispatch module 104 receives data describing events from the input device 102, and stores the received data describing the input device events in event queue 106. For example, a user interacting with the electronic device 100 using a mouse or a touchpad may provide an input for scrolling content displayed on the GUI and, in response, event queue 106 can store data describing the input device events in the order they were performed. In addition to storing the received input device events, event queue 106 can store data describing other events related to the GUI, for example, messages to be displayed at particular positions on the GUI.

Events stored in event queue 106 are processed by an event processing module 108 in the order in which they were stored in event queue 106. In some implementations, event processing module 108 may "spawn," that is, clone, a first thread, such as a main UI thread 110 for processing events related to the GUI from event queue 106. Main UI thread 110 can process events stored in event queue 106 in the order in which the events were received by the event dispatch module 104.

In various implementations, event processing module 108 may spawn one or more other threads, such as one or more background threads 112 that can process events from event queue 106. In some implementations, the background threads 112 process input device events that are stored in event queue 106 when the main UI thread 110 is involved in processing some other task, or when the main UI thread 110 is idle or processing by the main UI thread 110 is interrupted in some manner.

In some implementations, the main UI Thread 110 may not always be performing some task. When the main thread is not performing some task, this is known as "idle time" and the work done at "idle time" is performed by the idle timer 119. In some implementations, during idle time the UI process may retrieve portions of the GUI that are spatially proximate to the presently displayed area, and draw images of the retrieved portions into non-visible tiles 118 in a non-visible tile layer 116. The non-visible drawn images will be stored in the tile layer 116 with the images drawn into the tiles 118 into the buffer 114.

The buffer 114 may be a portion of the device memory used for temporary storage of data. For example, the buffer 114 may be a RAM buffer. The data stored in the buffer 114, such as the tiles 118 in the tile layer 116, may be accessed by the background threads 112, the main UI thread 110, or by both.

In some implementations, the main UI thread 110 may "look ahead" to examine the next events that are stored in the event queue 106. By performing the look ahead, the main UI thread may use the idle time to retrieve additional portions of the GUI that are to be shown next on the display. The additional GUI portions are then drawn into tiles 118, with the image contents stored in buffer 114.

The next input device event stored in the event queue 106 that is processed by the main UI thread 110 may be a scroll of the GUI content shown on the electronic device display. In some implementations, upon processing the next input device event, the main UI thread 110 may show images drawn into some of the tiles 118 as part of the new GUI area that is shown on the display.

In some implementations, the amount of storage space allocated to the buffer 114 may be limited. Alternatively, or in addition, the amount of processing power that may be used to retrieve the additional GUI portions may be constrained. In such implementations, the background threads 112 may store the images in the tiles 118 in a compressed version. The main UI thread may initially show the compressed images as a new GUI area is shown upon processing a scrolling input device event. While the compressed images are shown, the uncompressed GUI portions may be fetched, and then the main UI thread renders the uncompressed GUI portions on the display replacing the compressed images.

In some implementations, the background threads 112 may store multiple tile layers 116. Each tile layer may represent a different view of the GUI that may be shown on the display. In such implementations, the idle timer 119 may pre-fetch entire pages of views of the GUI. For each page corresponding to a tile layer, images of page sections or subviews are drawn into tiles. The images are compressed and stored in the tiles in the corresponding tile layers. Subsequently the originally retrieved pages are discarded to save on buffer space. When the next scrolling input device event is processed, the scrolling operation accesses the tile layer 116 that stores the compressed images corresponding to the area of the GUI that is shown based on the scroll, and initially shows the compressed images. If there is a sufficient time delay before processing the next input device event, the uncompressed page sections are retrieved and shown replacing the compressed images.

Using the mechanisms described in the preceding sections, the electronic device 100 may show actual GUI contents when scrolling input event is executed, instead of showing blank space, white space, or some placeholder graphic. The mechanisms also may be used to pre-cache additional UIs that can be quickly shown when the user changes the displayed UI, such as when the user moves from one UI to another. The additional UIs may be pre-cached with relatively low overhead in terms of memory space, or in terms of processing power used, compared to storing uncompressed UI elements.

FIGS. 2A-2I illustrate the implementation of progressive tiling on an exemplary GUI 200 that is presented on the display of an electronic device. For example, the GUI 200 may be a GUI that is shown on the display coupled to the electronic device 100. Accordingly, the following sections describe the implementation of progressive tiling on the GUI 200 as applied to the electronic device 100. However, the GUI 200 also may be associated with other electronic devices or systems.

Figure 2A:
FIGS. 2A-2I illustrate the implementation of progressive tiling on an exemplary GUI that is presented on the display of an electronic device.

As shown in FIG. 2A, an area 202 of the GUI 200 may be visible on the display of the electronic device 100. The area 202 may depend on the dimensions of the display, or on constraints imposed by the operating system processes that manage the GUI 200, or on some other suitable parameter.

The operating system processes may use a non-visible tile layer to manage the GUI 200. The tile layer is a logical rendering of the GUI 200, including areas of the GUI 200 that are not visible on the display of the electronic device 100. The tile layer is divided into tiles, which are sections of the tile layer having dimensions that are based on the shape and size of the GUI 200. For example, in one implementation, the size of a tile may correspond to 256 pixels. In some implementations, the tile dimensions also may depend on the direction in which the scrolling movement takes place. Similar to the tile layer, the tiles are logical constructs used by the operating system processes for managing the GUI 200, and are not visible to the user.

Figure 2B:
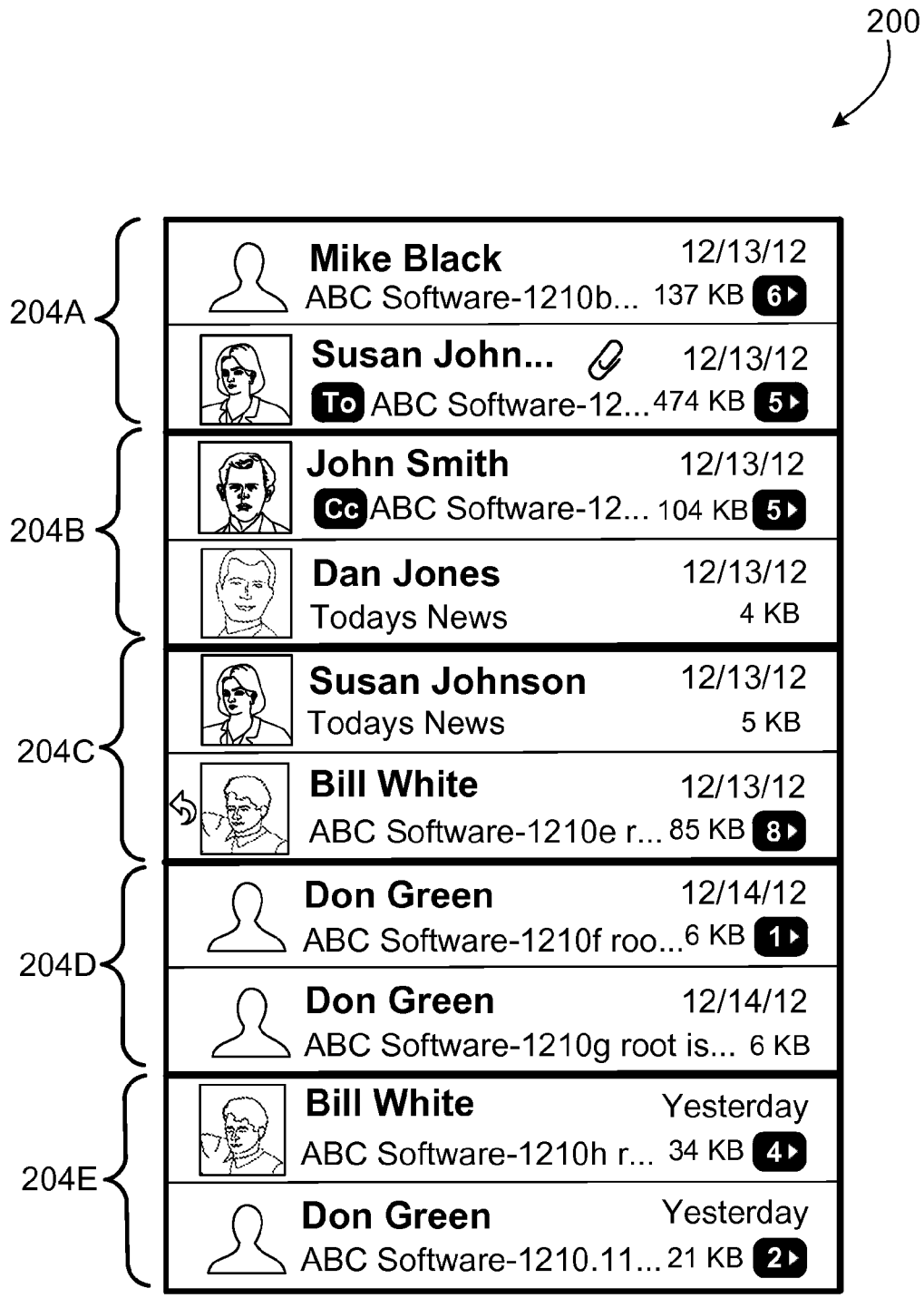

Each portion of the GUI 200 is mapped to a tile in the tile layer, including the visible area 202 of the GUI 200. FIG. 2B shows the visible area of the GUI 200 mapped to tiles 204A, 204B, 204C, 204D and 204E, which are collectively referred to as 204A-204E. The tiles 204A-204E are not visible on the display of the electronic device 100.

The contents of the tiles in the tile layer are modified as the data in the GUI 200 are updated based on user input events. In some implementations, some non-visible areas of the GUI 200 may be empty, for example, when GUI contents for such areas have not been processed by the operating system. In such implementations, the tiles corresponding to the empty areas are consequently empty.

Figure 2C:
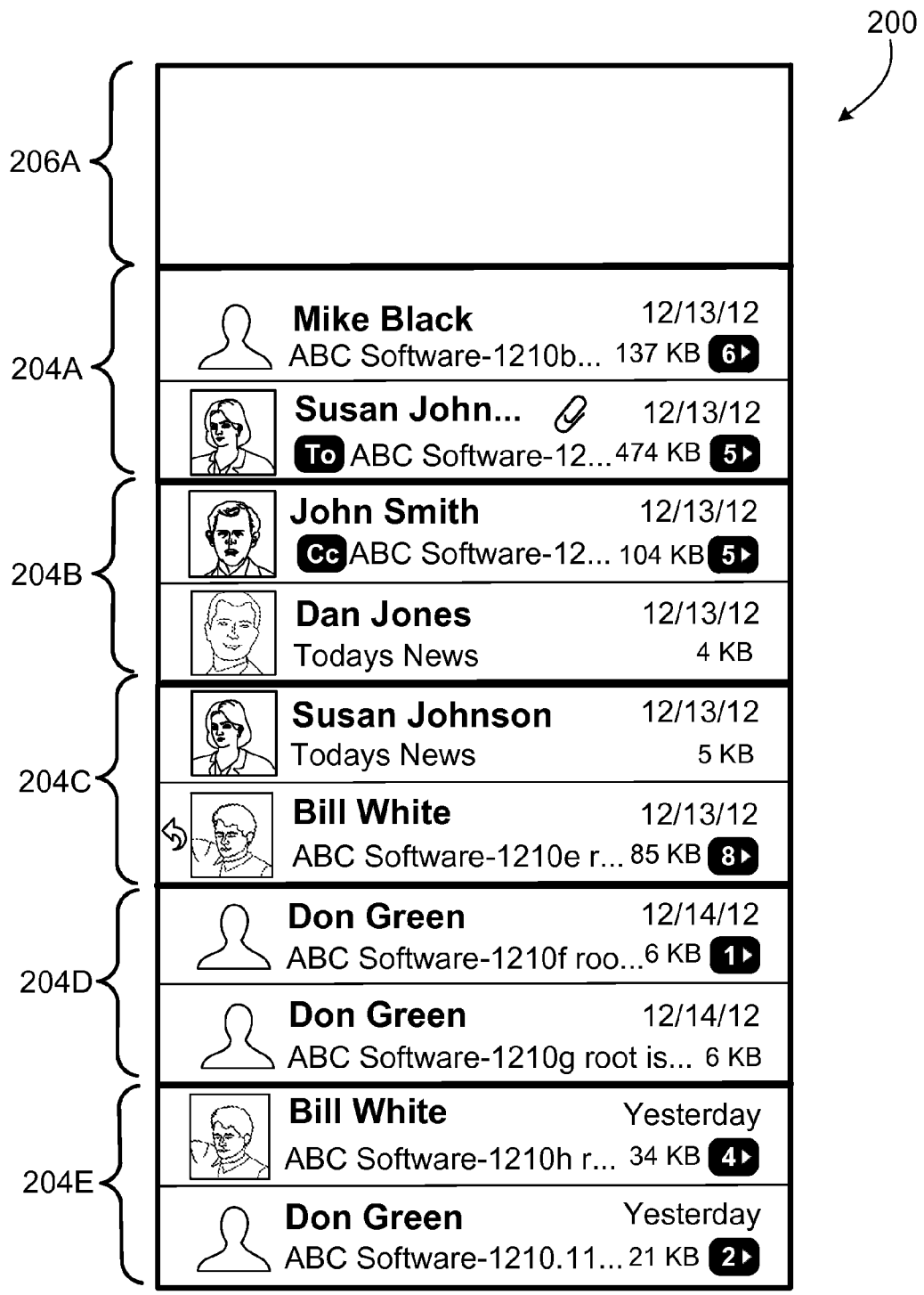

The operating system managing the GUI 200 overdraws non-visible GUI content to improve the performance of scrolling the GUI 200. For example, as shown in FIG. 2C, in some implementations the operating system adds a non-visible tile 206A to the GUI 200 that is adjacent to the tiles 204A-204E corresponding to the visible area of the GUI 200. The tile 206A may be added by the idle timer 119, that is, when the main UI thread 110 is not processing an input device event. The tile 206A may be added by the main UI thread 110, or by a background thread 112 based on whether or not the main UI thread 110 is busy. For the remainder of the discussion, it is assumed that the idle timer 119 or a background thread 112 adds the tile 206A, and other non-visible tiles, and renders the pre-cached content onto the display screen. However, it will be understood that the operations may be equally executed by the main UI thread 110, or by some other suitable thread or process.

Figure 2D:
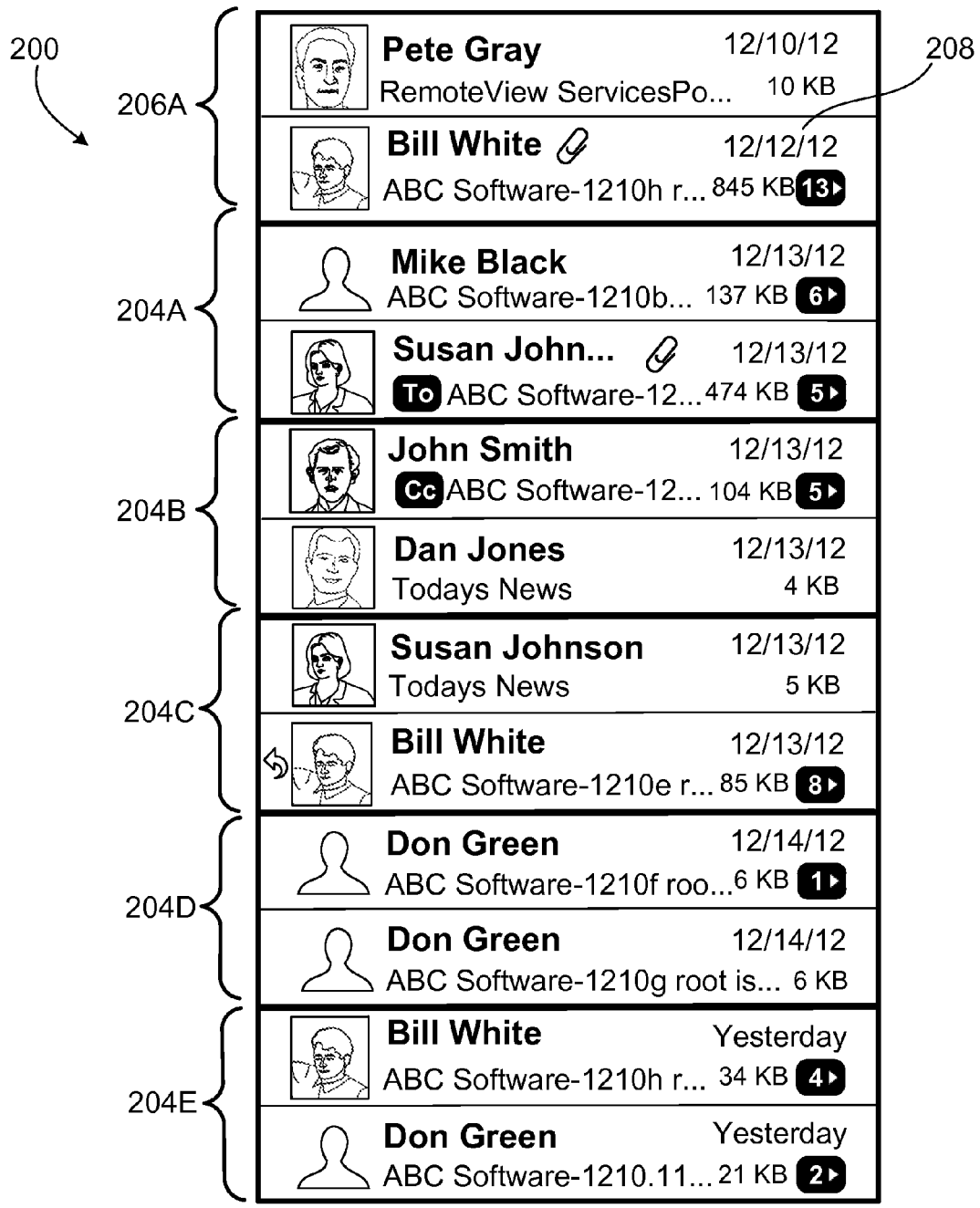

In some implementations, the idle timer 119 pre-fetches a subview of the GUI 200 that is spatially adjacent to the displayed area 200, and draws the subview to the tile 206A. For example, as shown in FIG. 2D, the subview 208 is "stamped" or drawn to the tile 206A, that is, GUI elements corresponding to the subview 208 are retrieved from long-term memory and an image of the subview 208 is copied into the area of the tile layer in the buffer 114 that corresponds to the tile 206A.

The subview 208 includes GUI content that is spatially adjacent to the GUI content corresponding to tile 204A, such that upon a scrolling input, the GUI content associated with the subview 208 may be shown on the display of the electronic device 100. However, at the time of addition of the subview 208, since the tile 206A is not part of the displayed area 202, the subview 208 is not visible to the user.

Figure 2E:
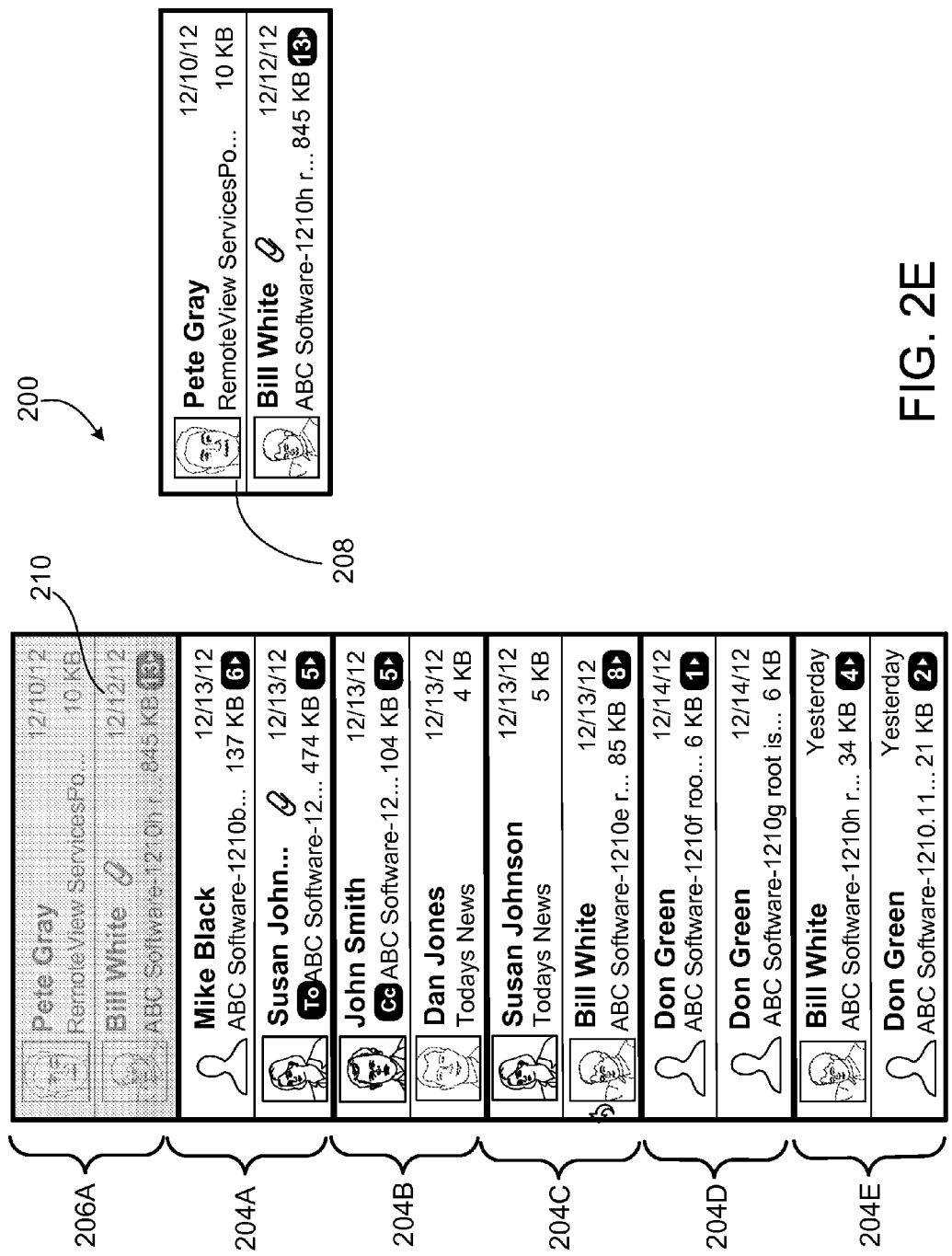

Once the subview 208 is drawn to the tile 206A in the buffer 114, the subview 208 may be removed, that is, the GUI elements corresponding to the subview 208 that are retrieved from long-term memory and temporarily stored in the buffer 114 may be discarded. However, the image of the subview 208 that is "stamped" to the tile 206A remains in the tile layer in the buffer 114. For example, as shown in FIG. 2E, the stamped image 210 of the subview 208 is included in the tile 206A, while the subview 208 is removed. As described previously, this may be referred to as "UI stamping" or "view stamping."

In some implementations, following the process described in the preceding sections, one or more background threads 112, or the idle timer 119, or some suitable combination of the background threads 112 and the idle timer 119, may pre-fetch into the buffer 114 entire view of the GUI 200, and stamp tiles in the tile layer with the content of subviews that make up the pre-fetched view. The pre-fetched view is then discarded. In this context, a view refers to an amount of GUI content that is spatially adjacent to the area of the GUI presently shown on the display. The size of a view may be limited by the size of the memory area that is available to store the view, or by the processing power used to pre-fetch the view contents, or by a suitable combination of both. A subview refers to a portion of a view. In some implementations, the size of a subview may correspond to the size of a tile while in other implementations the two sizes may be independent.

Figure 2F:
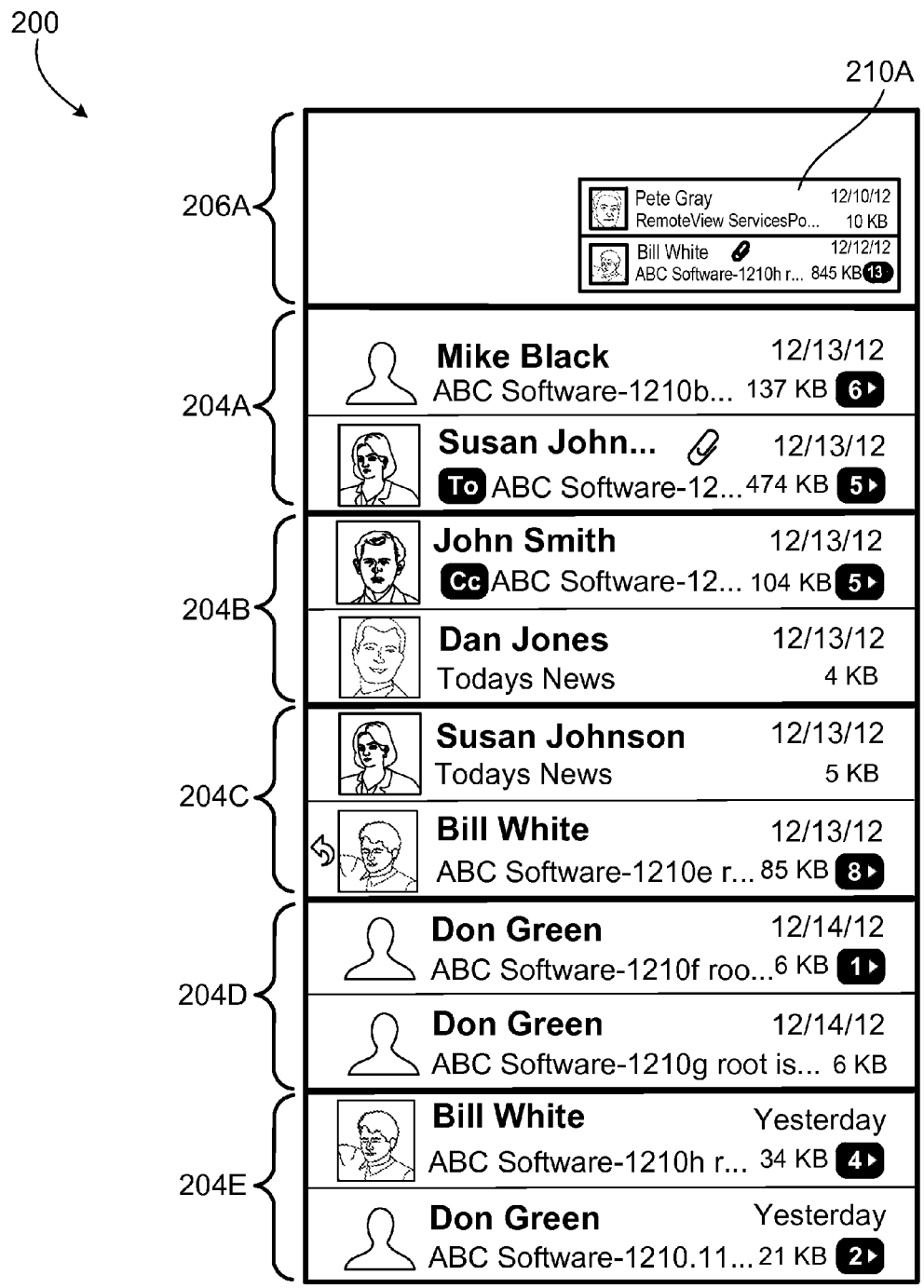

Once images are drawn into the tiles, the background threads 112 compress the images. For example, as shown in FIG. 2F, the image 210 is compressed into version 210A. The dimensions of image 210A are shown as shrunk to provide a visual indication that the image has been compressed. The background threads 112 compress the images using either a lossy compression algorithm, or a lossless compression algorithm. For example, the background threads 112 may use one or more of Joint Photographic Experts Group (JPEG) compression, JPEG2000, Portable Network Graphics (PNG) or Tagged Image File Format (TIFF).

By compressing the tile images, substantial buffer space may be saved. For example, the uncompressed image 210 may be in the order of 3 megabytes (MB) or 4 MB in size. On the other hand, the size of the compressed image 210A may be in the order of 200 kilobytes (KB). Therefore, by compressing, nearly 94% reduction in size of the image may be achieved.

Figure 2G:
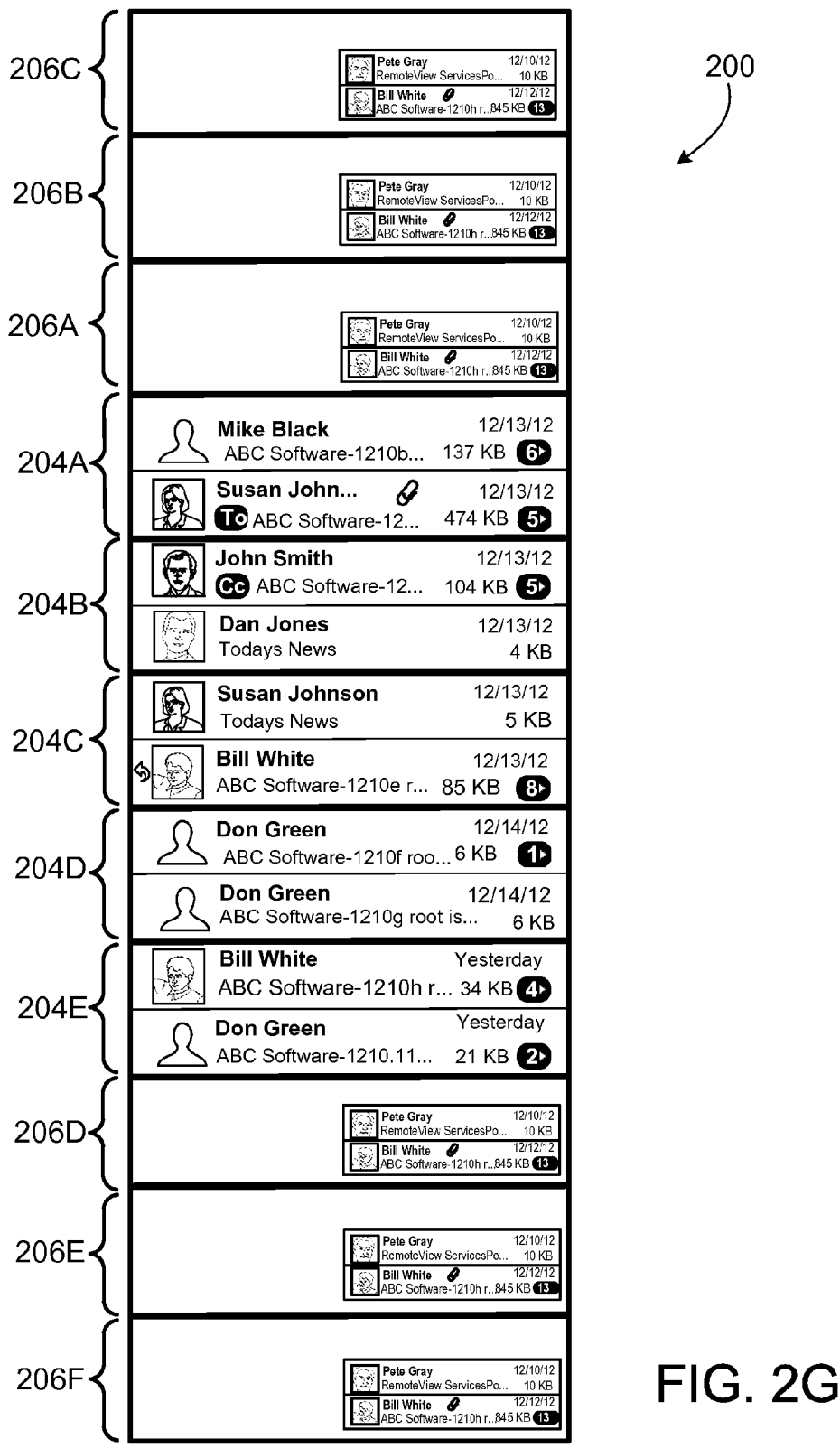

In a manner similar to the preceding section, the background threads 112 may draw images of subviews into tiles on all sides of the scrollable area, compress the images and stored the compressed images in the tiles in the buffer 114. For example, FIG. 2G shows non-visible tiles 206B and 206C added above the tiles 204A-204E corresponding to the displayed area 202, and the tiles 206D, 206E and 206F added below the tiles 204A-204E. Each of the tiles 206B, 206C, 206D, 206E and 206F include one or more compressed images, as indicated in FIG. 2G. Since the tiles 206B, 206C, 206D, 206E and 206F corresponding to non-visible areas of the GUI 200, the included compressed images are not visible on the display of the electronic device 100.

The number of subviews that are drawn into a tile depends on the dimensions of the tile. In some implementations, each tile may store an image corresponding to one subview, or some other suitable UI element. In other implementations, each tile may store several images corresponding to several subviews. For example, a tile may have 5 rows for 5 subviews. The background threads 112 or idle timer 119 fetch 5 subviews from a queue in the buffer, draw images corresponding to the subviews into the 5 rows of the tile, compress the images on the background threads 112 and then discard the subviews.

In some implementations, the images drawn into the tiles may be compressed using varying degrees of compression. The images that are drawn into tiles closer to the displayed area 202 may be compressed to a lesser degree compared to images that are drawn into tiles that farther away. For example, a low compression may be applied to the image 210A and the image stored in the tile 206D, while more compression may be applied to the images stored in the tiles 206B and 206E. The images stored in the tiles 206C and 206F may be compressed even more compared to the images stored in the tiles 206B and 206E. Consequently, upon a scrolling event, the first compressed images that are shown, for example 210A or the image stored in the tile 206D, are shown with relatively low compression such that the corresponding UI elements are better visible.

Figure 2H:
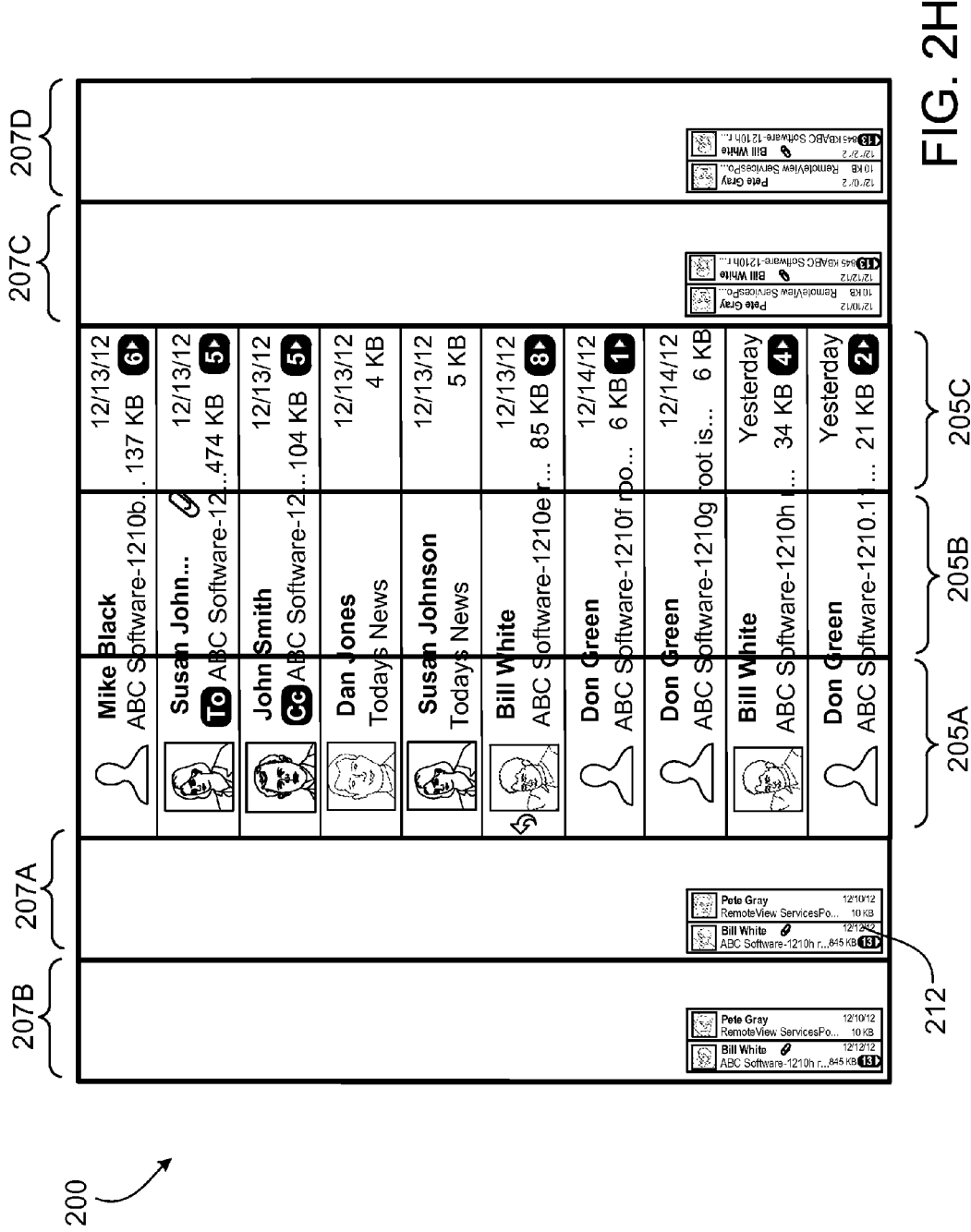

The tiles 206A, 206B, 206C, 206D, 206E and 206F may be added vertically above and below the displayed area 202 when the scrolling movement is in a vertical direction, that is, either up or below. If the scrolling movement is in a horizontal direction, that is, left or right, then the background threads 112 and/or the idle timer 119 may add tiles on the sides of the displayed area 202. For example, as shown in FIG. 2H, the displayed area may correspond to tiles 205A, 205B and 205C, which may be collectively referred to as 205A-205C. The background threads 112 and/or the idle timer 119 may add non-visible tiles 207A, 207B, 207C and 207D (collectively referred to as 207A-207D) on the left and the right sides adjacent to the tiles 205A-205C. Each non-visible tile 207A-207D includes a compressed image, such as 212 included in 207A, which are compressed versions of subviews of the GUI 200 that correspond to the tiles 207A-207D, respectively.

In some implementations, the background threads 112 and/or the idle timer 119 may add non-visible tiles in both vertical and horizontal directions. The total number of tiles that are added with compressed images may be based on predetermined thresholds. For example, the total number of tiles with images that are stored may be limited by memory consumption, such as the space available in the buffer 114. Alternatively, or in addition, the total number of tiles with images that are stored may be limited by the processing power consumed by the threads for generating and compressing the images. The operating system may allow the processes managing the GUI 200 to use a certain percentage of the processing power to perform the background processing, which may limit the number of tiles with images that are generated.

When a scrolling input event is processed by the operating system, the processes managing the GUI 200 may not be able to immediately render on the visible area of the display the uncompressed GUI content corresponding to the subview that scrolls into view in the displayed area 202. This may be the case, for example, when the velocity of the scroll is too fast in comparison to the processing speed used by to retrieve the GUI contents from storage and render on the displayed area of the GUI. In such cases, the main UI thread 110, or the background threads 112 may initially show the compressed images retrieved from the buffer 114 as placeholder for the uncompressed GUI content. When the uncompressed GUI contents are retrieved, the main UI thread 110 or the background threads 112 draw the uncompressed contents on the displayed area of the GUI 200, replacing the compressed placeholder images.

Figure 2I:
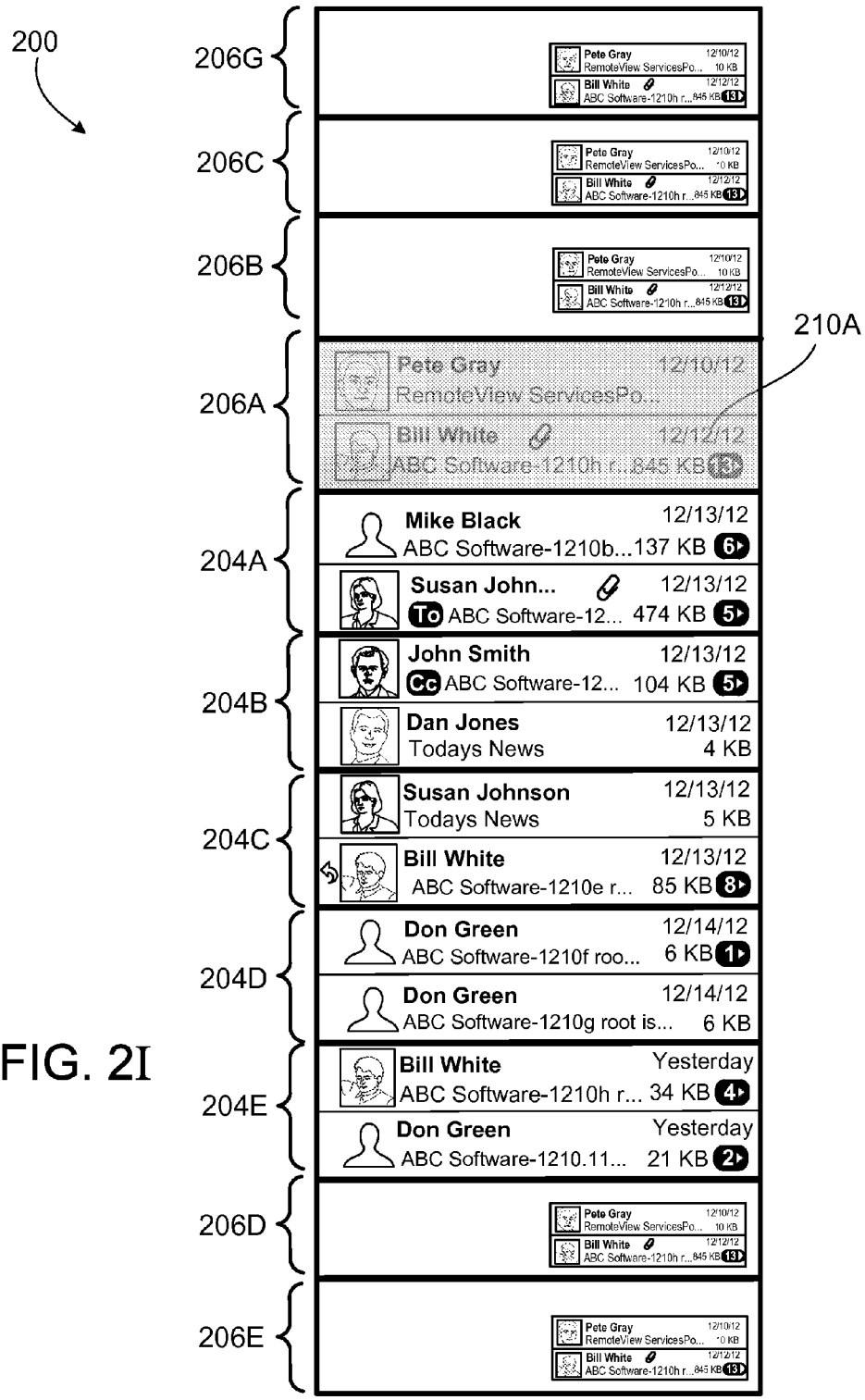

For example, FIG. 2I shows execution of a vertical scrolling event in the downward direction that results in the GUI content shown on the display moving down by a portion similar to the dimensions of a tile. The subview corresponding to the tile 204E scrolls out of view, while the GUI portion corresponding to the tile 206A scrolls into view. As the GUI portion becomes visible, initially the compressed image 210A that was stored in the buffer 114 corresponding to the tile 206A is shown on the display. The gray overlay on the image 210A indicates that the GUI content shown by the image 210A is compressed, while the other GUI contents shown on the display are uncompressed. When the subview 208 associated with the compressed image 210A is retrieved, the main UI thread 110 draws the subview 208 in the area 202 of the GUI shown on the display, replacing the image 210A.

Figure 3:
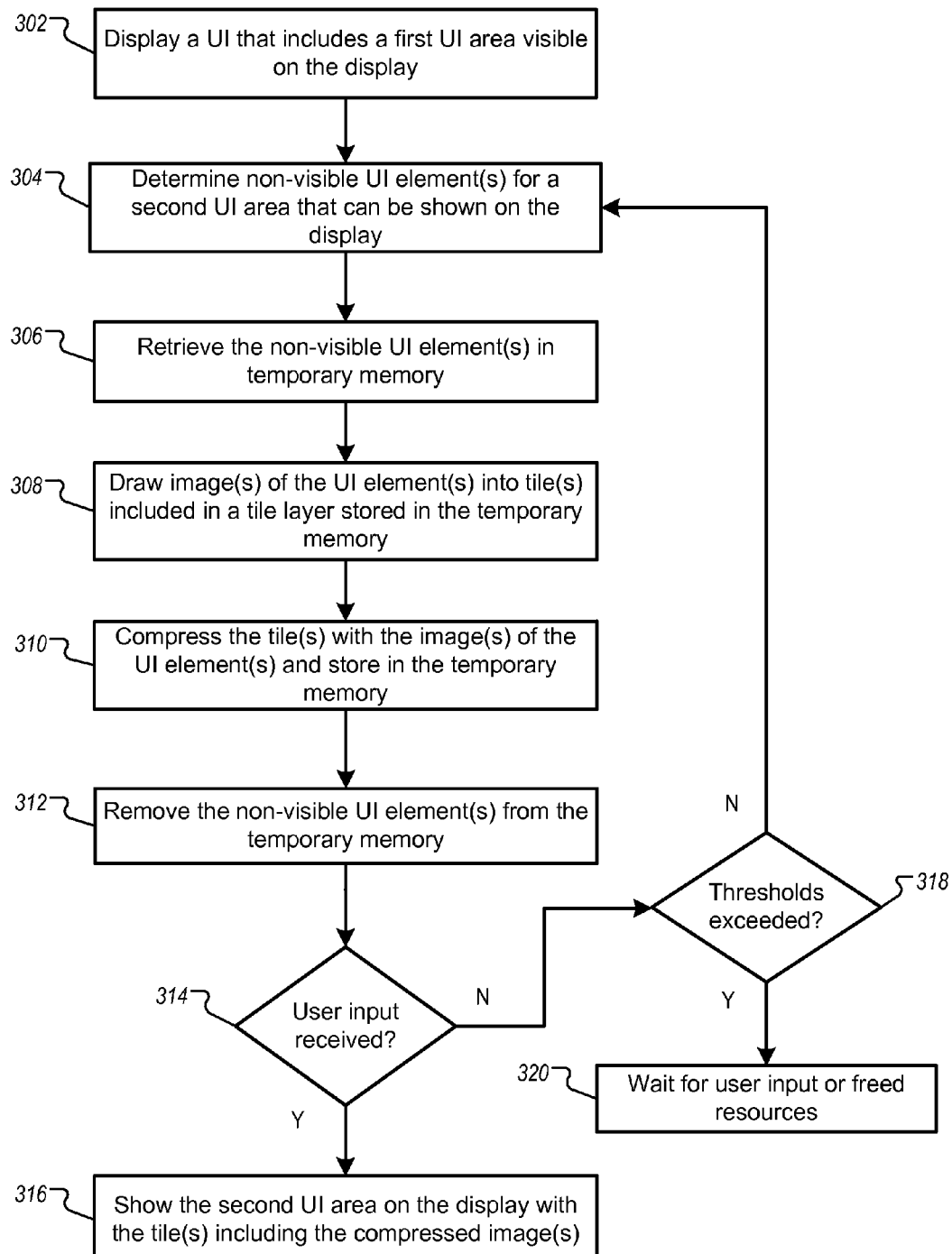
FIG. 3 illustrates an example of a process that may be used for performing progressive tiling for non-visible areas of a UI that may be shown on the display of an electronic device.

FIG. 3 illustrates an example of a process 300 that may be used for performing progressive tiling for non-visible areas of a UI that may be shown on the display of an electronic device. The process 300 may be performed to manage the GUI 200 on the electronic device 100, for example, by the main UI thread 110, or the background threads 112, or the idle timer 119. The following sections describe the process 300 as performed by a combination of the main UI thread 110, the background threads 112 and the idle timer 119 that are part of the processes managing the GUI 200 on the electronic device 100. However, the process 300 also may be performed individually by the main UI thread 110, by the background threads 112, by the idle timer 119, other threads or processes executed by the processors in the electronic device 100, or by a suitable combination of some or all of the above. The process 300 also may be implemented by other devices, systems and system configurations.

In some implementations, the process 300 displays a user interface (UI) that includes a first UI area visible on the display (302). For example, the operating system processes managing the GUI 200 may show the area 202 of the GUI 200 on the display of the electronic device 100. The main UI thread 110 may be executed to manage the display of the area 202.

The process 300 determines non-visible UI element(s) for a second UI area that can be shown on the display (304). For example, the operating system processes managing the GUI 200 may determine portions of the GUI 200 that are spatially adjacent to the displayed area 202, and that may become visible on the display of the electronic device 100 upon a scrolling input from the user. The operating system processes may determine one or more UI elements that comprise the content for the portions of the GUI 200 that are spatially adjacent to the displayed area 202. The UI elements may include subviews of the GUI 200. Since the determined UI elements are included in portions of the GUI 200 that are not shown on the display, the UI elements are not visible to the user.

In some implementations, the main UI thread 110 may determine the non-visible UI elements for the second UI area, or the main UI thread 110 may instruct the idle timer 119 or the background threads 112 to determine the non-visible UI elements for the second UI area, or the idle timer 119 and/or the background threads 112 may autonomously determine the non-visible UI elements for the second UI area. In other implementations, additional threads spawned by the processes managing the GUI 200, or some other operating system process, may determine the non-visible UI elements for the second UI area.

The non-visible UI element(s) are retrieved in temporary memory (306). For example, as part of determining non-visible UI elements for the second UI area, the main UI thread 110, the idle timer 119 and/or the background threads 112 may determine an entire view of the GUI 200 and the subviews corresponding to the determined view. The main UI thread 110, the idle timer 119 and/or the background threads 112 may fetch into the buffer 114 the subviews that make up the determined view. This may be the case in implementations where UI stamping is performed. However, in implementations where progressive overdrawing is performed without UI stamping, the main UI thread 110, the idle timer 119 and/or the background threads 112 may fetch into the buffer 114 only subviews that are spatially adjacent to the displayed area of the GUI 200.

Image(s) of the UI element(s) are drawn into tile(s) included in a tile layer stored in the temporary memory (308). For example, the UI processes may manage the GUI 200 using a logical, non-visible tile layer stored in the buffer 114. The tile layer may be composed of logical sections, that is, tiles. Images of the one or more subviews that are pre-fetched into the buffer 114 may be drawn into corresponding tiles whose relative positions in the tile lay map to the relative placement of the subviews in the GUI 200.

The tile(s) with the image(s) of the UI element(s) are compressed and stored in the temporary memory (310). For example, the background threads 112 may use compression algorithms to compress the images drawn into the tiles. As described previously, either lossy or lossless, or both, compression may be used, such as JPEG, JPEG200, PNG or TIFF. The tiles with the compressed images may be stored in the buffer 114, occupying considerably less storage space compared to the uncompressed UI elements.

The non-visible UI element(s) are removed from the temporary memory (312). For example, once the images are drawn into the tiles and compressed, the original UI elements are temporarily stored in the buffer 114 may be discarded so as to free up space. In implementations where multiple subviews making up an entire view are pre-fetched, the various subviews and the view are discarded.

While performing progressive tiling as described in the preceding sections, the operating system processes check whether user input is received (314). For example, the main UI thread 110 or the background threads 112 may periodically check the event queue 106 for the next input device event.

If a user input is received, the second UI area is shown on the display with the tile(s) including the compressed image(s) (316). For example, the user input may be a scrolling input that changes the portion of the GUI 200 shown on the display from the first area to the second area. The velocity of the scroll may be too fast such that the main UI thread is not be able to immediately render on the visible area of the display the uncompressed GUI content corresponding to the second area. Instead, the main UI thread 110 initially retrieves from the buffer 114 the compressed images associated with the second area and shows the compressed images as placeholder for the uncompressed GUI content. When the uncompressed GUI contents are retrieved, the main UI thread 110 draws the uncompressed contents on the displayed area of the GUI 200, replacing the compressed placeholder images.

On the other hand, if no user input is received, the operating system processes may continue with performing progressive tiling. However, additional progressive tiling is performed if there are sufficient resources available to support the operations. Accordingly, the main UI thread 110, the idle timer 119 and/or the background threads 112 check whether thresholds are exceeded (318). For example, the threads may check whether space is available in the buffer 114 for overdrawing additional tiles. Alternatively, or in addition, the threads may check whether the processing power consumed by the threads for performing progressive tiling is within the predetermined thresholds set by the operating system.

If the thresholds are not exceeded, the operating system processes continue with the pre-fetching UI elements, drawing them into tiles and compressing and storing the tiles in memory (304)-(312). On the other hand, if any of the thresholds is exceeded, the main UI thread 110, the idle timer 119 and/or the background threads 112 cease to perform further progressive tiling operations. The threads wait for user input or freed resources (320). When a user input is received that changes the displayed area 202, some or all of the stored subviews may be discarded such that space in the buffer is freed up for new progressive tiling to be performed.

Figure 4:
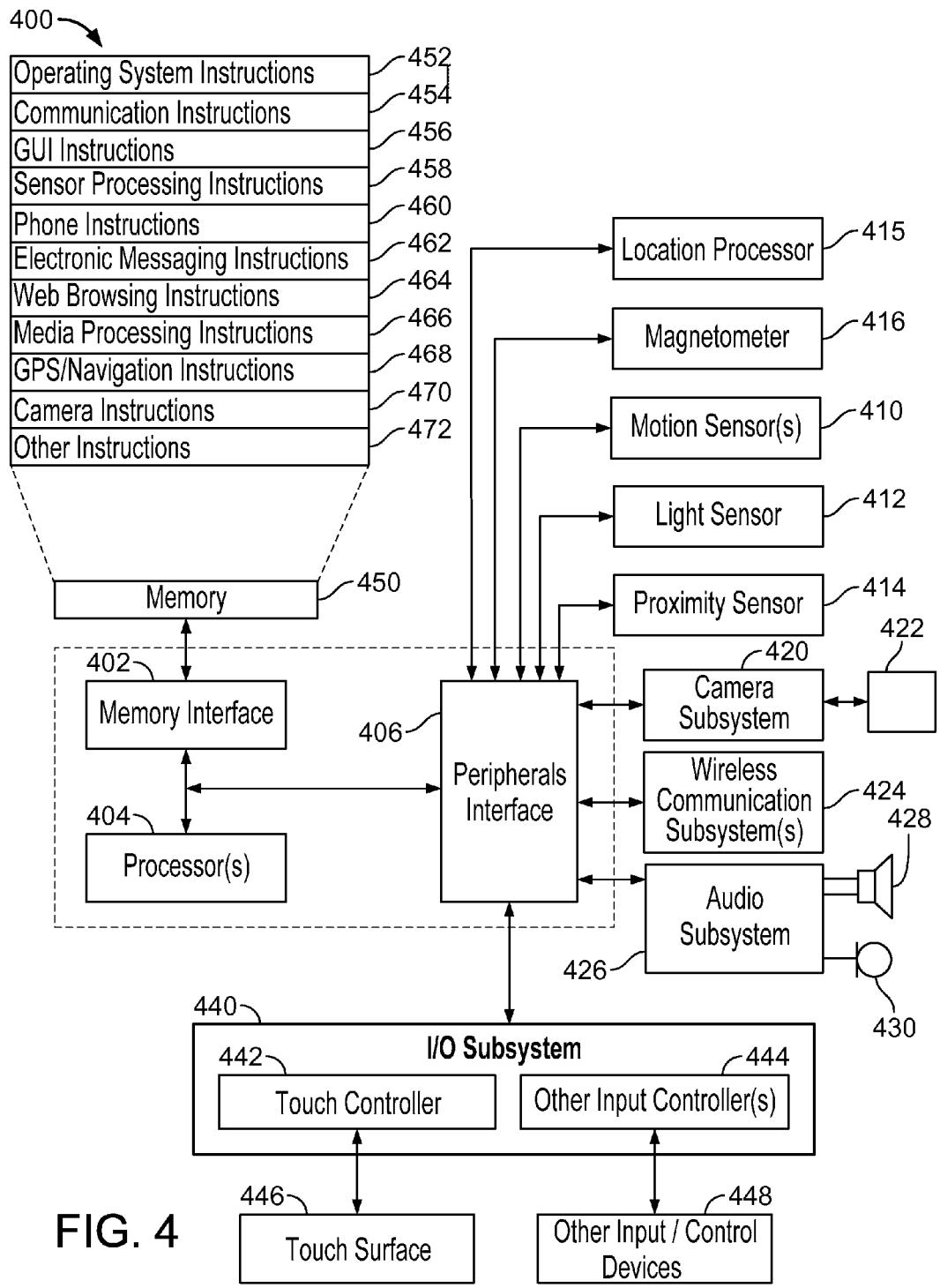
FIG. 4 is a block diagram of an exemplary architecture for a device capable of input device event processing.

FIG. 4 is a block diagram of an exemplary architecture 400 for a device capable of input device event processing. The architecture 400 can be implemented in any device for generating the features described in reference to FIGS. 1-3, including but not limited to portable or desktop computers, smart phones and electronic tablets, television systems, game consoles, kiosks and the like. Architecture 400 can include memory interface 402, data processor(s), image processor(s) or central processing unit(s) 404, and peripherals interface 406. Memory interface 402, processor(s) 404 or peripherals interface 406 can be separate components or can be integrated in one or more integrated circuits. The various components can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate orientation, lighting, and proximity functions of the device. For example, in some implementations, light sensor 412 can be utilized to facilitate adjusting the brightness of touch surface 446. In some implementations, motion sensor 410 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 406, such as a temperature sensor, a biometric sensor, or other sensing device, to facilitate related functionalities.

Location processor 415 (e.g., GPS receiver) can be connected to peripherals interface 406 to provide geo-positioning. Electronic magnetometer 416 (e.g., an integrated circuit chip) can also be connected to peripherals interface 406 to provide data that can be used to determine the direction of magnetic North. Thus, electronic magnetometer 416 can be used as an electronic compass.

Camera subsystem 420 and an optical sensor 422, e.g., a charged coupled device (CCD) or a complementary metaloxide semiconductor (CMOS) optical sensor, can be utilized to facilitate camera functions, such as recording photographs and video clips.

Communication functions can be facilitated through one or more communication subsystems 424. Communication subsystem(s) 424 can include one or more wireless communication subsystems. Wireless communication subsystems 424 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 424 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, WiMAX, or 3G networks), code division multiple access (CDMA) networks, and a Bluetooth™ network. Communication subsystems 424 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 426 can be coupled to a speaker 428 and one or more microphones 430 to facilitate voice-enabled functions, such as voice recognition, voice replication, digital recording, and telephony functions.

I/O subsystem 440 can include touch controller 442 and/or other input controller(s) 444. Touch controller 442 can be coupled to a touch surface 446. Touch surface 446 and touch controller 442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 can display virtual or soft buttons and a virtual keyboard, which can be used as an input/output device by the user.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In some implementations, device 400 can present recorded audio and/or video files, such as MP3, AAC, and MPEG files. In some implementations, device 400 can include the functionality of an MP3 player and may include a pin connector for tethering to other devices. Other input/output and control devices can be used.

Memory interface 402 can be coupled to memory 450. Memory 450 can include high-speed random access memory or non-volatile memory, such as one or more magnetic disk storage devices, one or more optical storage devices, or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers or servers. Communication instructions 454 can also be used to select an operational mode or communication medium for use by the device, based on a geographic location (obtained by the GPS/Navigation instructions 468) of the device. Memory 450 may include graphical user interface instructions 456 to facilitate graphic user interface processing, such as described in reference to FIGS. 1-4; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions and display GUIs; media processing instructions 466 to facilitate media processing-related processes and functions; GPS/Navigation instructions 468 to facilitate GPS and navigation-related processes; and camera instructions 470 to facilitate camera-related processes and functions. The memory 450 may also store other software instructions 472 for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

What is claimed is:

1. A method comprising:
  displaying, on a display coupled to an electronic device, a first area of a user interface (UI) that is located in a visible display area on the display;
  determining one or more non-visible UI elements corresponding to a second area of the UI that is not presently shown in the visible display area on the display, wherein the one or more non-visible UI elements are spatially adjacent to UI elements included in the first area of the UI;
  drawing one or more images of the one or more non-visible UI elements into one or more tiles in a tile layer that provides a non-visible representation of views associated with the UI, the tile layer stored in a temporary memory area, and a tile corresponding to a logical section of the UI;
  compressing the one or more images drawn into the one or more tiles in the tile layer with varying degrees of compression, wherein a degree of compression of a non-visible UI element that is spatially farther away from UI elements included in the first area of the UI is greater than a degree of compression of a non-visible UI elements that is spatially closer to the UI elements included in the first area of the UI; and
  in response to a user input on the electronic device scrolling the non-visible UI element into the visible display area, presenting, in the visible display area of the display, a representation of the second area of the UI including the one or more compressed images.

2. The method of claim 1, wherein the first and second areas of the UI include content associated with the UI that are viewable on the display of the electronic device, and wherein the content includes at least one of UI features, graphical images and electronic documents.

3. The method of claim 2, wherein the first and second areas of the UI share content, the second area of the UI corresponding to an incremental change in the content associated with the first area of the UI.

4. The method of claim 1, wherein the tile layer includes a pre-cached bitmap of the UI, and wherein the tile layer includes compressed images corresponding to UI elements included in a view of the UI.

5. The method of claim 1,
wherein a particular UI element is drawn into a particular tile whose relative position in the tile layer is a relative placement of the particular UI element in the UI.

6. The method of claim 1, wherein images of non-visible UI elements corresponding to the second area of the UI are drawn into tiles and compressed one at a time until predetermined thresholds are met, or the non-visible UI elements associated with the second area of the UI are drawn in entirety.

7. The method of claim 6, where the predetermined thresholds include at least one of:
an amount of memory consumed by drawing images of the non-visible UI elements into the tiles and compressing the images,
an amount of power consumed by drawing images of the non-visible UI elements into the tiles and compressing the images, and
a size or count of the tiles into which the images of the non-visible UI elements corresponding to the second area of the UI are drawn.

8. The method of claim 1, comprising:
displaying the UI that includes a first area of the UI visible on the display using a foreground process thread executed on the electronic device; and
determining the non-visible UI element corresponding to the second area of the UI, drawing the image of the non-visible UI element into the tile in the tile layer and compressing the image using at least one of an idle timer on the foreground process thread or a background process thread executed on the electronic device.

9. The method of claim 8, wherein determining the non-visible UI element corresponding to the second area of the UI, drawing the image of the non-visible UI element into the tile in the tile layer and compressing the image using at least one of the idle timer on the foreground process thread or the background process thread comprises:
determining the non-visible UI element corresponding to the second area of the UI, drawing the image of the non-visible UI element into the tile in the tile layer and compressing the image using at least one of the idle timer on the foreground process thread or the background process thread when the foreground process thread is idle.

10. The method of claim 1, further comprising: retrieving an uncompressed view of a UI element corresponding to a compressed image included in the representation of the second area of the UI presented in the visible display area of the display; and replacing the compressed image with a rendering of the retrieved uncompressed view of the UI element in the visible display area of the display.

11. The method of claim 10, wherein retrieving the uncompressed view of the UI element corresponding to the compressed image comprises: determining the scrolling stopping; and in response to determining the scrolling stopping, retrieving the uncompressed view of the UI element corresponding to the compressed image and replacing the compressed image with a rendering of the uncompressed view of the UI element in the visible display area of the display.

12. A system comprising:
a processor; and
instructions encoded in a non-transitory machine-readable medium for execution by the processor and, when executed, configured to cause the processor to perform operations comprising:
displaying, on a display coupled to an electronic device, a first area of a user interface (UI) that is located in a visible display area on the display;
determining one or more non-visible UI elements corresponding to a second area of the UI that is not presently shown in the visible display area on the display, wherein the one or more non-visible UI elements are spatially adjacent to UI elements included in the first area of the UI;
drawing one or more images of the one or more non-visible UI elements into one or more tiles in a tile layer that provides a non-visible representation of views associated with the UI, the tile layer stored in a temporary memory area and a tile corresponding to a logical section of the UI;
compressing the one or more images drawn into the one or more tiles in the tile layer with varying degrees of compression, wherein a degree of compression of a non-visible UI element that is spatially farther away from UI elements included in the first area of the UI is greater than a degree of compression of a non-visible UI elements that is spatially closer to the UI elements included in the first area of the UI; and
in response to a user input on the electronic device scrolling the non-visible UI element into the visible display area, presenting, in the visible display area of the display, a representation of the second area of the UI including the one or more compressed images.

13. The system of claim 12, wherein the first and second areas of the UI include content associated with the UI that are viewable on the display of the electronic device, and wherein the content includes at least one of UI features, graphical images and electronic documents.

14. The system of claim 12,
wherein a particular UI element is drawn into a particular tile whose relative position in the tile layer is a relative placement of the particular UI element in the UI.

15. The system of claim 12, wherein images of non-visible UI elements corresponding to the second area of the UI are drawn into tiles and compressed one at a time until predetermined thresholds are met, or the non-visible UI elements associated with the second area of the UI are drawn in entirety.

16. The system of claim 15, where the predetermined thresholds include at least one of:
an amount of memory consumed by drawing images of the non-visible UI elements into the tiles and compressing the images,
an amount of power consumed by drawing images of the non-visible UI elements into the tiles and compressing the images, and a size or count of the tiles into which the images of the non-visible UI elements corresponding to the second area of the UI are drawn.

17. The system of claim 12, wherein the operations further comprise: retrieving an uncompressed view of a UI element corresponding to a compressed image included in the representation of the second area of the UI presented in the visible display area of the display; and replacing the compressed image with a rendering of the retrieved uncompressed view of the UI element in the visible display area of the display.

18. A computer program product, embedded in a non-transitory machine-readable medium storing instructions for execution by a processor that, when executed, are configured to cause the processor to perform operations comprising:
  displaying, on a display coupled to an electronic device, a first area of a user interface (UI) that is located in a visible display area on the display;
  determining one or more non-visible UI elements corresponding to a second area of the UI that is not presently shown in the visible display area on the display, wherein the one or more non-visible UI elements are spatially adjacent to UI elements included in the first area of the UI;
  drawing one or more images of the one or more non-visible UI elements into one or more tiles in a tile layer that provides a non-visible representation of views associated with the UI, the tile layer stored in a temporary memory area, and a tile corresponding to a logical section of the UI;
  compressing the one or more images drawn into the one or more tiles in the tile layer with varying degrees of compression, wherein a degree of compression of a non-visible UI element that is spatially farther away from UI elements included in the first area of the UI is greater than a degree of compression of a non-visible UI elements that is spatially closer to the UI elements included in the first area of the UI; and
  in response to a user input on the electronic device scrolling the non-visible UI element into the visible display area, presenting, in the visible display area of the display, a representation of the second area of the UI including the one or more compressed images.

19. The computer program product of claim 18, wherein the first and second areas of the UI include content associated with the UI that are viewable on the display of the electronic device, and
  wherein the content includes at least one of UI features, graphical images and electronic documents.

20. The computer program product of claim 18, wherein a particular UI element is drawn into a particular tile whose relative position in the tile layer is a relative placement of the particular UI element in the UI.

21. The computer program product of claim 18, wherein images of non-visible UI elements corresponding to the second area of the UI are drawn into tiles and compressed one at a time until predetermined thresholds are met, or the non-visible UI elements associated with the second area of the UI are drawn in entirety.

22. The computer program product of claim 21, where the predetermined thresholds include at least one of:
  an amount of memory consumed by drawing images of the non-visible UI elements into the tiles and compressing the images,
  an amount of power consumed by drawing images of the non-visible UI elements into the tiles and compressing the images, and
  a size or count of the tiles into which the images of the non-visible UI elements corresponding to the second area of the UI are drawn.

23. The method of claim 1, wherein a compressed image is a representation of an uncompressed view of a UI element corresponding to an image that is reduced in sized compared to the uncompressed view.

24. The computer program product of claim 18, wherein the operations further comprise: retrieving an uncompressed view of a UI element corresponding to a compressed image included in the representation of the second area of the UI presented in the visible display area of the display; and replacing the compressed image with a rendering of the retrieved uncompressed view of the UI element in the visible display area of the display.

* * * * *

UNITED STATES PATENT AND TRADEMARK OFFICE
CERTIFICATE OF CORRECTION

PATENT NO. : 9,874,991 B2
APPLICATION NO. : 13/830454
DATED : January 23, 2018
INVENTOR(S) : Corbin R. Dunn Page 1 of 1

It is certified that error appears in the above-identified patent and that said Letters Patent is hereby corrected as shown below:

In the Claims

Column 16, Line 56, replace "area," with -- area --; and

Column 19, Line 30, replace "area," with -- area --.

Signed and Sealed this
Twenty-seventh Day of March, 2018

Andrei Iancu
*Director of the United States Patent and Trademark Office*